Patented May 23, 1933

1,910,265

UNITED STATES PATENT OFFICE

ARTHUR SHAVER, OF OAK PARK, ILLINOIS, AND CHARLES N. FREY, OF SCARSDALE, NEW YORK, ASSIGNORS TO STANDARD BRANDS INCORPORATED, OF NEW YORK, N. Y., A CORPORATION OF DELAWARE

MANUFACTURE OF YEAST

No Drawing.  Application filed April 16, 1932.  Serial No. 605,776.

This invention relates to process of manufacturing dried baking yeast, and has as general object the provision of a process which may be carried out in a simple, efficient and economical manner to the production of dried yeast of improved quality.

A further object of the invention is to provide a process of manufacturing dried baking yeast which will keep for long periods of time and under ordinary temperatures, while retaining a high percentage of its baking strength.

A more specific object of the invention is to provide a process of conditioning bakers' yeast prior to drying, so that when freshly dried it has a baking strength approximately equal to that of fresh yeast and will retain at least 80% of this baking strength for a period of at least two months, when held at ordinary room temperature.

Other objects of the invention will in part be obvious and will in part appear hereinafter.

The invention accordingly comprises the several steps and the relation of one or more of such steps with respect to each of the others, which are exemplified in the following detailed disclosure, and the scope of the application of which will be indicated in the claims.

It is well known that when ordinary bakers' yeast is dried, it loses a certain percentage of its baking strength immediately and contains a smaller number of viable cells, and that as it is stored at ordinary room temperature the baking strength continues to decrease rapidly. A number of processes of conditioning the yeast prior to drying have been suggested, and, while some of these have been relatively successful, they have necessitated the use of costly materials not normally available in a modern yeast factory, and others have failed entirely to accomplish the desired result.

In accordance with the principles of the present invention, however, a process of conditioning the yeast prior to drying has been developed, in which only materials readily available in a modern yeast factory are utilized, and the resulting product has improved characteristics as evidenced by its sustained viability and baking strength after drying. In general, the present invention contemplates the treatment of bakers' yeast, which may previously have been prepared by any desired method, in molasses solution containing an increased proportion of organic nitrogen and carrying on the treatment for a period and under conditions such that a yeast is obtained having a fairly low protein content and a high glycogen content. We have found, for example, that if the protein content of the yeast is kept below 50% and glycogen content is raised to above 5%, preferably to between 5% and 10%, the yeast will, if dried under any reasonable conditions, maintain its baking strength for long periods of time, as above indicated.

As examples of specific mixtures of mash materials which may be used, the following may be noted:

(1) To a molasses, or molasses mixture, is added slop from a beet-molasses alcohol mash resulting from the fermentation of approximately an equivalent amount of molasses, and the mixture is clarified with calcium acid phosphate in an amount up to 5% of the molasses used.

(2) To a molasses or molasses mixture which has been clarified as above indicated, sufficient acid-hydrolyzed cottonseed meal extract, acid-hydrolyzed yeast extract or malt sprout extract, is added to supply the nitrogen requirements of the yeast.

The yeast conditioning process is carried out preferably by introducing from 20%–120%, and preferably 80%, of yeast (based on the molasses) into a fraction of the mash materials which has been diluted to about 2° Bg.; and, while aerating, the remainder of the wort is added in accordance with the growth requirements of the yeast, and preferably in a slow and continuous stream. The aeration is continued for a period of about twelve hours, during the last two of which no further additions are made so that the yeast has a period in which to ripen off. During this time, the yeast is nourished only on organic nitrogen, some of which of course comes from the molasses, but most of which is derived from the added material, such as slop, malt sprout extract or hydrolyzed extract of cottonseed-meal, lard, cracklings, or yeast, as the case may be; with the result that the protein content of the yeast is generally maintained below 50% and the glycogen content is raised, producing the desired results.

After the conditioning treatment, the yeast is separated and compressed in the usual way and may be dried by any suitable and convenient manner, but preferably by extruding it into thin spaghetti-like strings and drying at a temperature of between 5° and 15° C., over a period of 24 to 36 hours. More specifically, the temperature should preferably not exceed 15° C. for the first 24 hours.

By such process we have found that when a yeast so conditioned is freshly dried, it has approximately the same baking strength as when it is fresh, and materially greater baking strength then or after storage at room temperature for seventy-two days, than a yeast which has not been conditioned, as is shown in the following table:

| Amount of yeast | Expansion time | | Dried after storage at room temp. for 72 days |
|---|---|---|---|
| | Fresh | Freshly dried | |
| 6 grams of fresh conditioned yeast per 300 grams of flour | 101 | 100 | 144 |
| Not conditioned | 88 | 122 | 322 |

It will thus be seen that by means of the present invention there has been provided a convenient, efficient and economical process of manufacturing dried baking yeast of improved quality, and since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described. Particularly it is to be understood that in said claims, ingredients or compounds recited in the singular are intended to include compatible mixtures of such ingredients wherever the sense permits.

Having described our invention, what we claim as new and desire to secure by Letters Patent is:

1. A process of conditioning yeast prior to drying which comprises treating it with aeration in a molasses solution containing added yeast assimilable organic nitrogen until the protein content of the yeast is below 50% and the glycogen content is raised to about 5% or above.

2. A process of conditioning yeast prior to drying which comprises treating it with aeration in a molasses solution containing added distillery slop until the protein content of the yeast is below 50% and the glycogen content is raised to about 5% or above.

3. A process of conditioning yeast prior to drying which comprises treating it with aeration in a molasses solution containing approximately 100% of distillery slop until the protein content of the yeast is below 50% and the glycogen content is raised to about 5% or above.

4. A process of conditioning yeast prior to drying which comprises treating it with aeration in a molasses solution containing an added extract of acid-hydrolyzed protein material until the protein content of the yeast is below 50% and the glycogen content is raised to about 5% or above.

5. A process of conditioning yeast prior to drying which comprises treating it with aeration in a molasses solution containing added malt sprout extract until the protein content of the yeast is below 50% and the glycogen content is raised to about 5% or above.

6. A method of manufacturing dried yeast of improved quality, comprising in combination, treating it with aeration in a molasses solution containing added yeast assimilable organic nitrogen until the protein content of the yeast is below 50% and the glycogen content is raised to about 5% or above, separating and pressing off the yeast and drying at a temperature not exceeding 15° C. for the first 24 hours.

In testimony whereof we affix our signatures.

ARTHUR SHAVER.
CHARLES N. FREY.